(12) United States Patent
Chen et al.

(10) Patent No.: US 10,817,454 B2
(45) Date of Patent: Oct. 27, 2020

(54) DYNAMIC LANE ACCESS SWITCHING BETWEEN PCIE ROOT SPACES

(71) Applicant: Intel Corporation, Santa Clara, CA (US)

(72) Inventors: Chih-Cheh Chen, Ladera Ranch, CA (US); Janusz P. Jurski, Beaverton, OR (US); Amit Kumar Srivastava, Folsom, CA (US); Malay Trivedi, Chandler, AZ (US); James Mitchell, Chandler, AZ (US); Piotr Michael Kwidzinski, Folsom, CA (US); David N. Lombard, Los Rossmoor, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/396,153

(22) Filed: Apr. 26, 2019

(65) Prior Publication Data
US 2019/0251055 A1   Aug. 15, 2019

(51) Int. Cl.
*G06F 13/40* (2006.01)
*G06F 13/42* (2006.01)
(Continued)

(52) U.S. Cl.
CPC .......... *G06F 13/4068* (2013.01); *G06F 1/329* (2013.01); *G06F 1/3228* (2013.01);
(Continued)

(58) Field of Classification Search
CPC combination set(s) only.
See application file for complete search history.

(56) References Cited

U.S. PATENT DOCUMENTS

| | | | |
|---|---|---|---|
| 2006/0023633 A1* | 2/2006 | Caruk | G06F 1/3203 370/252 |
| 2011/0222111 A1* | 9/2011 | Shima | G06F 13/4282 358/1.15 |

(Continued)

OTHER PUBLICATIONS

Dong, Xiangu et al., "Leveraging 3D PCRAM Technologies to Reduce Checkpoint Overhead for Future Exascale Systems," Hewlett-Packard Labs, Pennsylvania State University, SC09 Nov. 14-20, 2009, Copyright 2009, ACM 978-1-60558-744-8/09/11 (12 pages).

*Primary Examiner* — Raymond N Phan
(74) *Attorney, Agent, or Firm* — Alliance IP, LLC

(57) ABSTRACT

An apparatus includes physical layer circuitry with lanes to couple the apparatus to endpoint devices. a first input/output (I/O) controller to couple a first processor to the physical layer circuitry, and a second I/O controller to couple a second processor to the physical layer circuitry. The first and second I/O controllers are compatible with a Peripheral Component Interconnect Express (PCIe)-based protocol. The apparatus also includes a flexible input/output adapter (FIA) coupling the first and second I/O controllers to the lanes. The FIA selectively assigns access to each lane of the lanes by either the first or second I/O controller. The apparatus also includes a power management controller (PMC) communicably coupled to the FIA. The PMC causes the FIA to dynamically assign access to at least one of the lanes by the first or second I/O controller without a reboot cycle.

20 Claims, 9 Drawing Sheets

(51) Int. Cl.
*G06F 1/329* (2019.01)
*G06F 1/3234* (2019.01)
*G06F 9/38* (2018.01)
*G06F 1/3228* (2019.01)

(52) U.S. Cl.
CPC .......... *G06F 1/3253* (2013.01); *G06F 9/3877* (2013.01); *G06F 13/4221* (2013.01); *G06F 2212/1028* (2013.01)

(56) References Cited

U.S. PATENT DOCUMENTS

| | | | |
|---|---|---|---|
| 2014/0281753 A1* | 9/2014 | Wagh | G06F 11/0757 714/56 |
| 2015/0205741 A1* | 7/2015 | Iyer | G06F 13/4221 710/104 |
| 2017/0154000 A1* | 6/2017 | Garibay | G06F 13/4022 |
| 2019/0332557 A1* | 10/2019 | O'Brien, III | G06F 13/20 |

* cited by examiner

DYNAMIC LANE ACCESS SWITCHING BETWEEN PCIE ROOT SPACES

FIELD

This disclosure pertains to computing system, and in particular (but not exclusively) to dynamic lane access switching between PCIe root spaces.

BACKGROUND

Interconnects can be used to provide communication between different components of a system (e.g., between a processor and a peripheral device), with some type of interconnect protocol being used to facilitate the communications. Some interconnects may use a Peripheral Component Interconnect Express (PCI Express™ (PCIe™))-based communication protocol. This communication protocol is one example of a load/store input/output (I/O) interconnect system. The communication between the devices is typically performed serially according to this protocol at very high speeds. In typical PCIe-based interconnects, communication links established between system components over one or more physical lanes may be static, meaning that the lanes may not be assigned to other communication links without requiring a reboot cycle.

DETAILED DESCRIPTION

Figure 1:
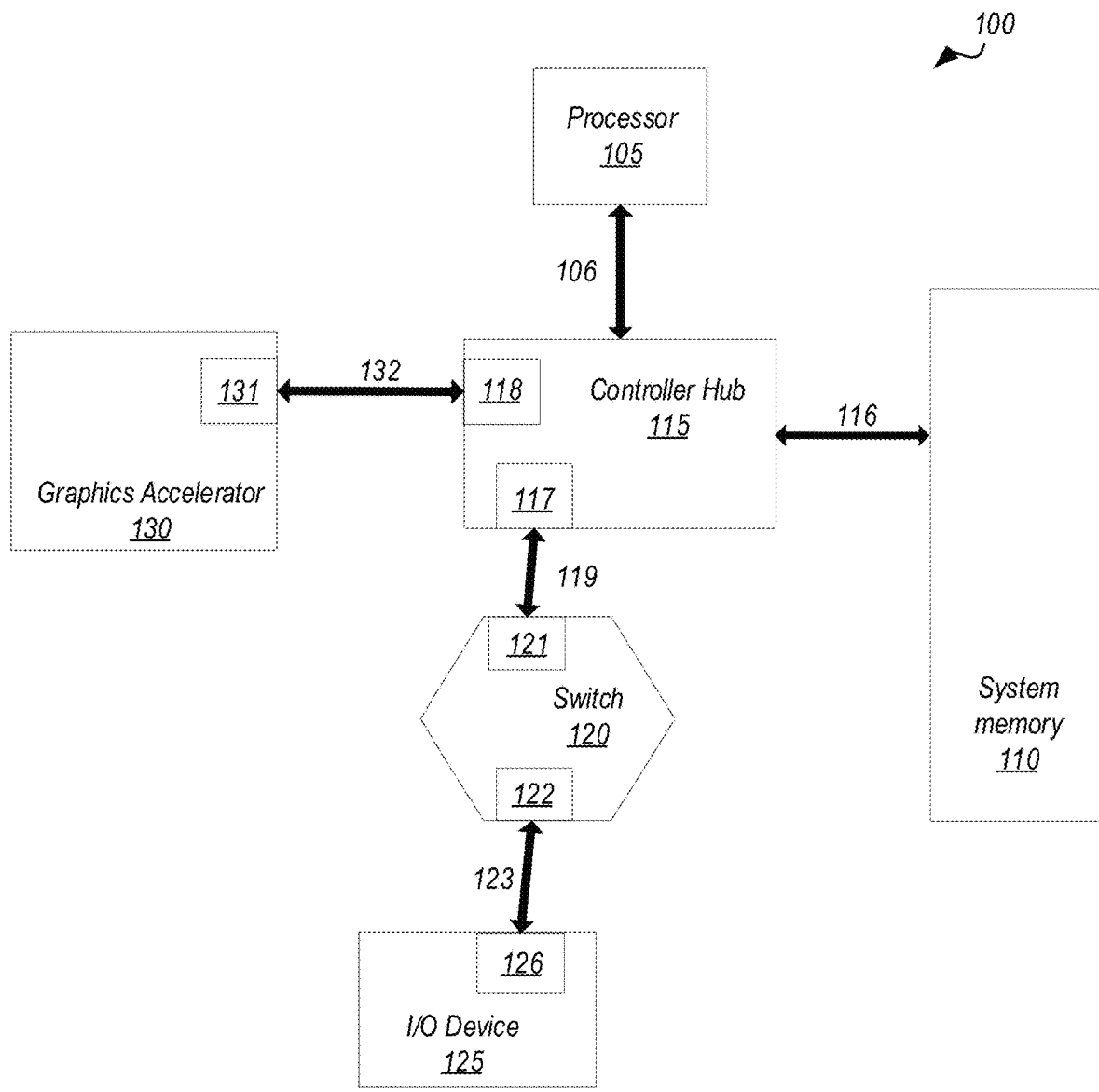
FIG. 1 illustrates an embodiment of a computing system including an example interconnect architecture.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present disclosure.

It will be apparent, however, to one skilled in the art that these specific details need not be employed to practice the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present disclosure.

Although the following embodiments may be described with reference to enhancements in specific computing systems, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems or Ultrabooks™. And may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future balanced with performance considerations.

As computing systems are advancing, the components therein are becoming more complex. As a result, the interconnect architecture to couple and communicate between the components is also increasing in complexity to ensure bandwidth requirements are met for optimal component operation. Furthermore, different market segments demand different aspects of interconnect architectures to suit the market's needs. For example, servers require higher performance, while the mobile ecosystem is sometimes able to sacrifice overall performance for power savings. Yet, it's a singular purpose of most fabrics to provide highest possible performance with maximum power saving. Below, a number of interconnects are discussed, which would potentially benefit from aspects of the embodiments described herein.

One interconnect fabric architecture includes the Peripheral Component Interconnect (PCI) Express (PCIe) architecture. A primary goal of PCIe is to enable components and devices from different vendors to inter-operate in an open architecture, spanning multiple market segments; Clients (Desktops and Mobile), Servers (Standard, Rack Scale, and Enterprise), and Embedded and Communication devices. PCI Express is a high performance, general purpose I/O interconnect defined for a wide variety of future computing and communication platforms. Some PCI attributes, such as its usage model, load-store architecture, and software interfaces, have been maintained through its revisions, whereas previous parallel bus implementations have been replaced by a highly scalable, fully serial interface. The more recent versions of PCI Express take advantage of advances in point-to-point interconnects, Switch-based technology, and packetized protocol to deliver new levels of performance and features. Power Management, Quality Of Service (QoS), Hot-Plug/Hot-Swap support, Data Integrity, and Error Handling are among some of the advanced features supported by PCI Express.

Referring to FIG. 1, an embodiment of a fabric composed of point-to-point Links that interconnect a set of components is illustrated. System 100 includes a processor 105 and system memory 110 coupled to controller hub 115. The processor 105 includes any processing element, such as a microprocessor, a host processor, an embedded processor, a co-processor, or other processor. The processor 105 may be coupled to controller hub 115 through front-side bus (FSB) 106. In one embodiment, FSB 106 may be a serial point-to-point interconnect as described below. In another embodiment, link 106 includes a serial, differential interconnect architecture that is compliant with different interconnect standard. In some implementations, the system may include logic to implement multiple protocol stacks and further logic to negotiation alternate protocols to be run on top of a common physical layer, among other example features.

System memory 110 includes any memory device, such as random access memory (RAM), non-volatile (NV) memory, or other memory accessible by devices in system 100. System memory 110 is coupled to controller hub 115 through memory interface 116. Examples of a memory interface include a double-data rate (DDR) memory interface, a dual-channel DDR memory interface, and a dynamic RAM (DRAM) memory interface.

Examples of controller hub 115 include a chipset, a platform controller hub (PCH), a memory controller hub (MCH), a northbridge, an interconnect controller hub (ICH) a southbridge, and a root controller/hub. The term chipset may refer, in some cases, to a platform controller hub (PCH), an in other cases, may refer to two physically separate controller hubs, i.e. a memory controller hub (MCH) coupled to an interconnect controller hub (ICH). In some embodiments, controller hub 115 is a root hub, root complex, or root controller in a Peripheral Component Interconnect Express (PCIe or PCIE) interconnection hierarchy. Peer-to-peer routing may optionally be supported through the controller hub 115 as a root complex. In other embodiments, the processor 105 may include root hub, root complex, and/or root controller functionality in a PCIe interconnection hierarchy, while the controller hub 115 is to communicate with I/O devices, in a similar manner as described below.

In the example shown, controller hub 115 is coupled to switch/bridge 120 through serial link 119. Input/output modules 117 and 121, which may also be referred to as interfaces/ports 117 and 121, include/implement a layered protocol stack to provide communication between controller hub 115 and switch 120. In one embodiment, multiple devices are capable of being coupled to switch 120. In the example shown, switch 120 is coupled to device 125 through serial link 123, and input/output modules 122 and 126, which may also be referred to as interfaces/ports 122 and 126, include/implement a layered protocol stack to provide communication between switch 120 and device 125. The switch/bridge 120 routes packets/messages from device 125 upstream, i.e. up a hierarchy towards a root complex, to controller hub 115 and downstream, i.e. down a hierarchy away from a root controller, from processor 105 or system memory 110 to device 125. Switch 120, in one embodiment, is referred to as a logical assembly of multiple virtual PCI-to-PCI bridge devices.

Device 125 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Often in the PCIe vernacular, such as device, is referred to as an endpoint. Although not specifically shown, device 125 may include a PCIe to PCI/PCI-X bridge to support legacy or other version PCI devices. Endpoint devices in PCIe are often classified as legacy, PCIe, or root complex integrated endpoints.

Graphics accelerator 130 is also coupled to controller hub 115 through serial link 132. In one embodiment, graphics accelerator 130 is coupled to an MCH, which is coupled to an ICH. Switch 120, and accordingly I/O device 125, is then coupled to the ICH. I/O modules 131 and 118 are also to implement a layered protocol stack to communicate between graphics accelerator 130 and controller hub 115. Similar to the MCH discussion above, a graphics controller or the graphics accelerator 130 itself may be integrated in, or coupled to, processor 105. Further, one or more links of the system can include one or more extension devices, such as retimers, repeaters, etc.

Figure 2:
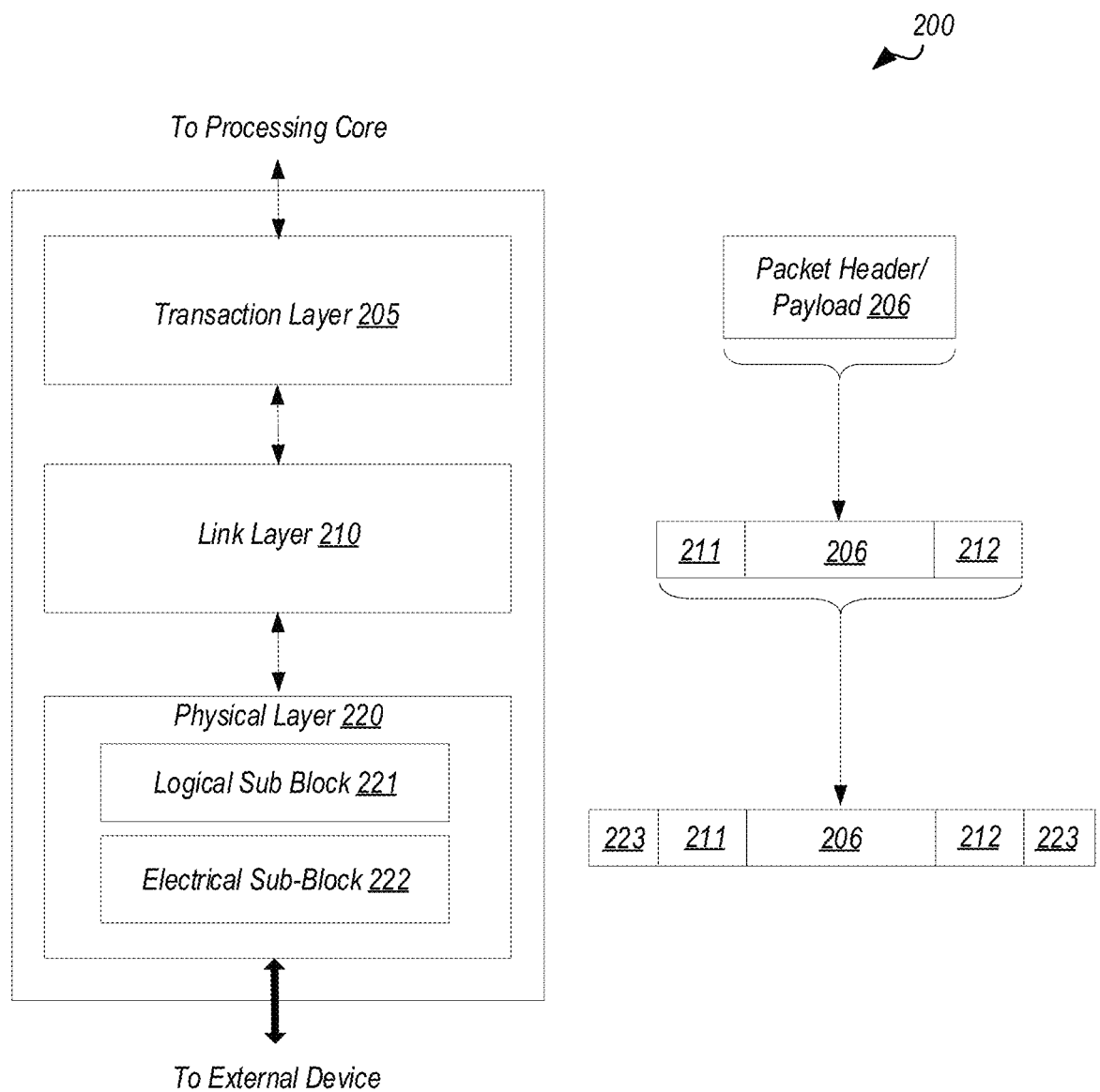
FIG. 2 illustrates an embodiment of an example interconnect architecture including a layered stack.

Turning to FIG. 2 an embodiment of a layered protocol stack is illustrated. Layered protocol stack 200 includes any form of a layered communication stack, such as a Quick Path Interconnect (QPI) stack, an Ultra Path Interconnect (UPI) stack, a PCIe stack, a next generation high performance computing interconnect stack, or other layered stack. Although the discussion immediately below in reference to FIGS. 1-4 are in relation to a PCIe stack, the same concepts may be applied to other interconnect stacks. In one embodiment, protocol stack 200 is a PCIe protocol stack including transaction layer 205, link layer 210, and physical layer 220. An interface, such as interfaces 117, 118, 121, 122, 126, and 131 in FIG. 1, may be represented as communication protocol stack 200. Representation as a communication protocol stack may also be referred to as a module or interface implementing/including a protocol stack.

PCI Express uses packets to communicate information between components. Packets are formed in the Transaction Layer 205 and Data Link Layer 210 to carry the information from the transmitting component to the receiving component. As the transmitted packets flow through the other layers, they are extended with additional information necessary to handle packets at those layers. At the receiving side the reverse process occurs and packets get transformed from their Physical Layer 220 representation to the Data Link Layer 210 representation and finally (for Transaction Layer Packets) to the form that can be processed by the Transaction Layer 205 of the receiving device.

Transaction Layer

In one embodiment, transaction layer 205 is to provide an interface between a device's processing core and the interconnect architecture, such as data link layer 210 and physical layer 220. In this regard, a primary responsibility of the transaction layer 205 is the assembly and disassembly of packets (i.e., transaction layer packets, or TLPs). The translation layer 205 typically manages credit-base flow control for TLPs. PCIe implements split transactions, i.e. transactions with request and response separated by time, allowing a link to carry other traffic while the target device gathers data for the response.

In addition PCIe utilizes credit-based flow control. In this scheme, a device advertises an initial amount of credit for each of the receive buffers in Transaction Layer 205. An external device at the opposite end of the link, such as controller hub 115 in FIG. 1, counts the number of credits consumed by each TLP. A transaction may be transmitted if the transaction does not exceed a credit limit. Upon receiving a response an amount of credit is restored. An advantage of a credit scheme is that the latency of credit return does not affect performance, provided that the credit limit is not encountered.

In one embodiment, four transaction address spaces include a configuration address space, a memory address space, an input/output address space, and a message address space. Memory space transactions include one or more of read requests and write requests to transfer data to/from a memory-mapped location. In one embodiment, memory space transactions are capable of using two different address formats, e.g., a short address format, such as a 32-bit address, or a long address format, such as 64-bit address. Configuration space transactions are used to access configuration space of the PCIe devices. Transactions to the configuration space include read requests and write requests. Message space transactions (or, simply messages) are defined to support in-band communication between PCIe agents.

Therefore, in one embodiment, transaction layer 205 assembles packet header/payload 206. Format for current packet headers/payloads may be found in the PCIe specification at the PCIe specification website.

Figure 3:
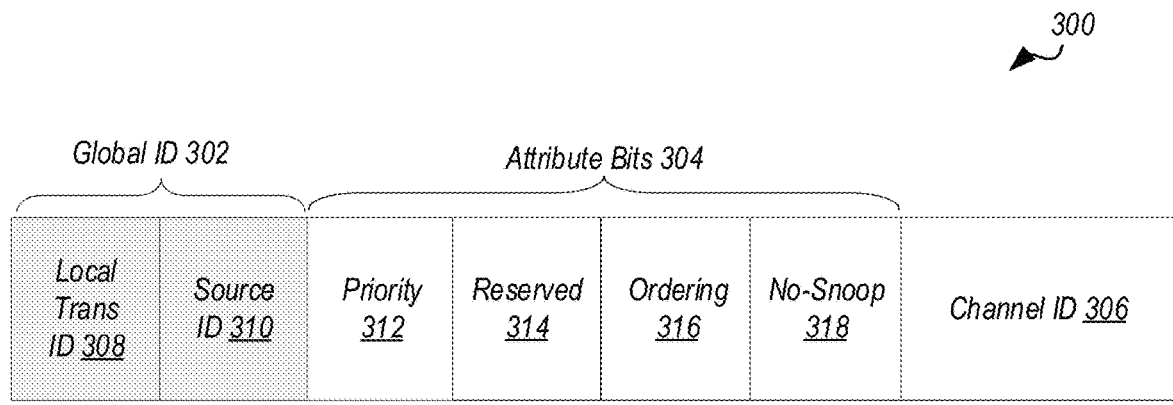
FIG. 3 illustrates an embodiment of a request or packet to be generated or received within an example interconnect architecture.

Quickly referring to FIG. 3, an embodiment of a PCIe transaction descriptor is illustrated. In one embodiment, transaction descriptor 300 is a mechanism for carrying transaction information. In this regard, transaction descriptor 300 supports identification of transactions in a system. Other potential uses include tracking modifications of default transaction ordering and association of transaction with channels.

Transaction descriptor 300 includes global identifier field 302, attributes field 304 and channel identifier field 306. In the illustrated example, global identifier field 302 is depicted comprising local transaction identifier field 308 and source identifier field 310. In one embodiment, global transaction identifier 302 is unique for all outstanding requests.

According to one implementation, local transaction identifier field 308 is a field generated by a requesting agent, and it is unique for all outstanding requests that require a completion for that requesting agent. Furthermore, in this example, source identifier 310 uniquely identifies the requestor agent within a PCIe hierarchy. Accordingly, together with source ID 310, local transaction identifier 308 field provides global identification of a transaction within a hierarchy domain.

Attributes field 304 specifies characteristics and relationships of the transaction. In this regard, attributes field 304 is potentially used to provide additional information that allows modification of the default handling of transactions. In one embodiment, attributes field 304 includes priority field 312, reserved field 314, ordering field 316, and no-snoop field 318. Here, priority sub-field 312 may be modified by an initiator to assign a priority to the transaction. Reserved attribute field 314 is left reserved for future, or vendor-defined usage. Possible usage models using priority or security attributes may be implemented using the reserved attribute field.

In this example, ordering attribute field 316 is used to supply optional information conveying the type of ordering that may modify default ordering rules. According to one example implementation, an ordering attribute of "0" denotes default ordering rules are to apply, wherein an ordering attribute of "1" denotes relaxed ordering, wherein writes can pass writes in the same direction, and read completions can pass writes in the same direction. Snoop attribute field 318 is utilized to determine if transactions are snooped. As shown, channel ID Field 306 identifies a channel that a transaction is associated with.

Link Layer

Link layer 210, also referred to as data link layer 210, acts as an intermediate stage between transaction layer 205 and the physical layer 220. In one embodiment, a responsibility of the data link layer 210 is providing a reliable mechanism for exchanging Transaction Layer Packets (TLPs) between two components a link. One side of the Data Link Layer 210 accepts TLPs assembled by the Transaction Layer 205, applies packet sequence identifier 211, i.e. an identification number or packet number, calculates and applies an error detection code, i.e. CRC 212, and submits the modified TLPs to the Physical Layer 220 for transmission across a physical to an external device.

Physical Layer

In one embodiment, physical layer 220 includes logical sub block 221 and electrical sub-block 222 to physically transmit a packet to an external device. Here, logical sub-block 221 is responsible for the "digital" functions of Physical Layer 220. In this regard, the logical sub-block includes a transmit section to prepare outgoing information for transmission by physical sub-block 222, and a receiver section to identify and prepare received information before passing it to the Link Layer 210.

Physical block 222 includes a transmitter and a receiver. The transmitter is supplied by logical sub-block 221 with symbols, which the transmitter serializes and transmits onto to an external device. The receiver is supplied with serialized symbols from an external device and transforms the received signals into a bit-stream. The bit-stream is de-serialized and supplied to logical sub-block 221. In one embodiment, an 8b/10b transmission code is employed, where ten-bit symbols are transmitted/received. Here, special symbols are used to frame a packet with frames 223. In addition, in one example, the receiver also provides a symbol clock recovered from the incoming serial stream.

As stated above, although transaction layer 205, link layer 210, and physical layer 220 are discussed in reference to a specific embodiment of a PCIe protocol stack, a layered protocol stack is not so limited. In fact, any layered protocol may be included/implemented. As an example, an port/interface that is represented as a layered protocol includes: (1) a first layer to assemble packets, i.e. a transaction layer; a second layer to sequence packets, i.e. a link layer; and a third layer to transmit the packets, i.e. a physical layer. As a specific example, a common standard interface (CSI) layered protocol is utilized.

Figure 4:
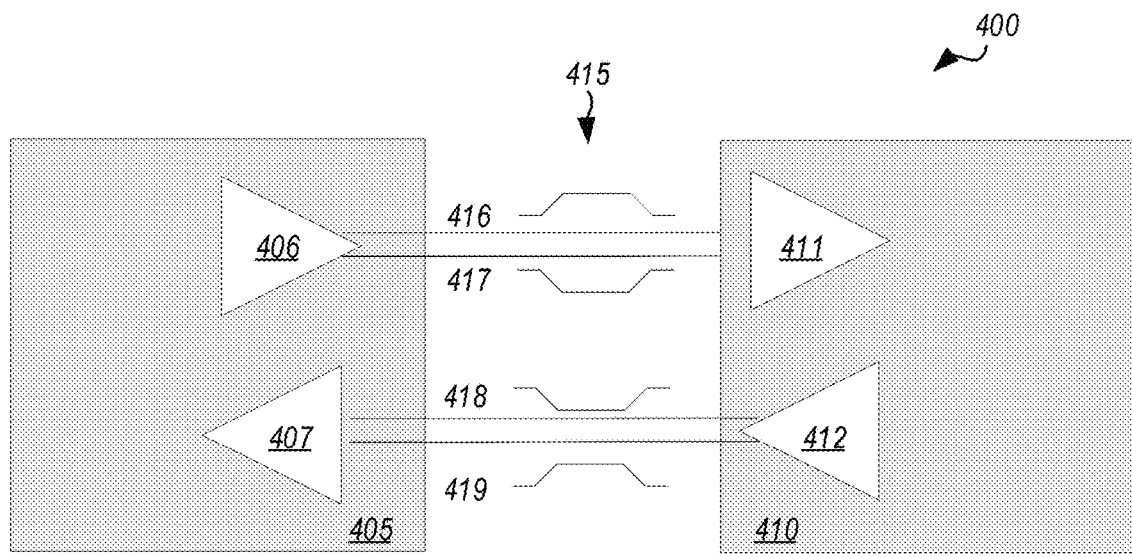
FIG. 4 illustrates an embodiment of a transmitter and receiver pair for an example interconnect architecture.

Referring next to FIG. 4, an embodiment of a PCIe serial point to point fabric is illustrated. Although an embodiment of a PCIe serial point-to-point link is illustrated, a serial point-to-point link is not so limited, as it includes any transmission path for transmitting serial data. In the embodiment shown, a basic PCIe link includes two, low-voltage, differentially driven signal pairs: a transmit pair 406/411 and a receive pair 412/407. Accordingly, device 405 includes transmission logic 406 to transmit data to device 410 and receiving logic 407 to receive data from device 410. In other words, two transmitting paths, i.e. paths 416 and 417, and two receiving paths, i.e. paths 418 and 419, are included in a PCIe link.

A transmission path refers to any path for transmitting data, such as a transmission line, a copper line, an optical line, a wireless communication channel, an infrared communication link, or other communication path. A connection between two devices, such as device 405 and device 410, is referred to as a link, such as link 415. A link may support one or more lanes—each lane representing a set of differential signal pairs (one pair for transmission, one pair for reception). To scale bandwidth, a link may aggregate multiple lanes denoted by xN, where N is any supported link width, such as 1, 2, 4, 8, 12, 16, 32, 64, or wider.

A differential pair refers to two transmission paths, such as lines 416 and 417, to transmit differential signals. As an example, when line 416 toggles from a low voltage level to a high voltage level, i.e. a rising edge, line 417 drives from a high logic level to a low logic level, i.e. a falling edge. Differential signals potentially demonstrate better electrical characteristics, such as better signal integrity, i.e. cross-coupling, voltage overshoot/undershoot, ringing, etc. This allows for better timing window, which enables faster transmission frequencies.

In some implementations, a high-performance interconnect and corresponding interconnect protocol (e.g., such as a next generation PCIe-based interconnect) may be provided that is capable of operating at high speeds such as 25 GT/s and/or 32 GT/s. In one example, two speeds may be defined for the high performance interconnect, one at 25 GT/s and 32 GT/s, based on the characteristics determined for the channel (e.g., during link training). The interconnect, in one implementation, may be backwards compatible with existing PCIe generations and speeds provided for these generations (e.g., 8 GT/s, 16 GT/s, etc.).

Figure 5:
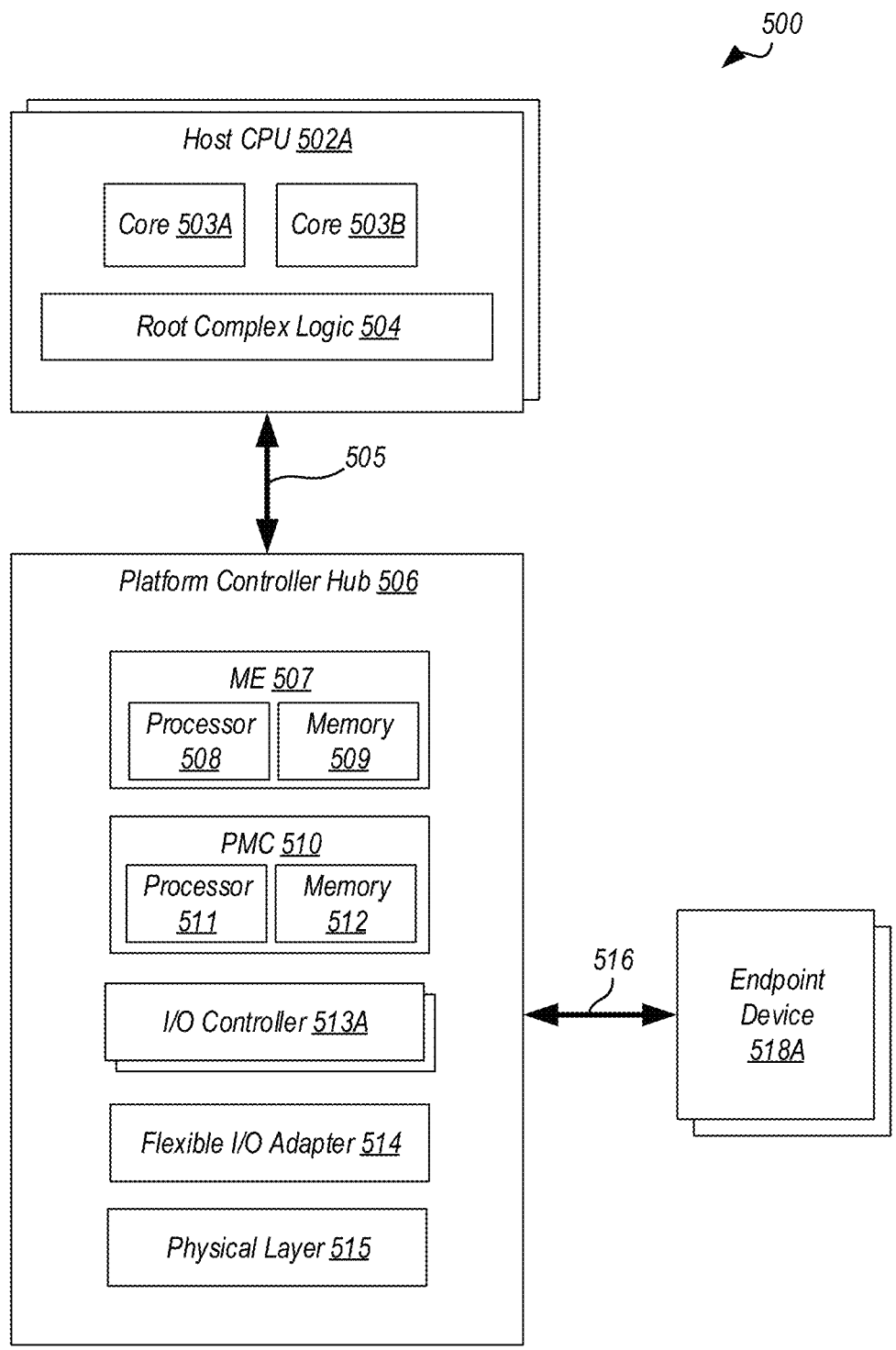
FIG. 5 illustrates an embodiment of an example interconnect architecture according to embodiments of the present disclosure.

FIG. 5 illustrates an embodiment of an example interconnect architecture according to embodiments of the present disclosure. The example system 500 includes multiple host CPUs 502 connected to a platform controller hub (PCH) 506 through a link 505. The link 505 may be implemented as a Direct Media Interface (DMI), which may utilize an inter-connect protocol such as, for example, DMI 2.0 or DMI 3.0. In some cases, one CPU may be communicably coupled to the PCH via the DMI interface, and all of the CPUs may be communicably coupled to each other via an inter-processor interconnect (e.g., via a Quick Path Interconnect (QPI) or Ultra Path Interconnect (UPI)).

Each CPU 502 may include any type of processor or processing device, such as a microprocessor, an embedded processor, a digital signal processor (DSP), a network processor, a handheld processor, an application processor, a co-processor, a system on a chip (SOC), or other device to execute code. Each CPU 502 may include one or more cores (e.g., 503A, 503B) and root complex logic (e.g., 504). The root complex logic may perform one or more root complex functions for a PCIe-based interconnect protocol, and may establish a host CPU root space in the system 500. Establishing a root space in the system 500 may include associating a particular root port of an interconnect architecture (e.g., PCIe-based interconnect architecture) corresponding to a particular processor (e.g., a root port corresponding to a CPU 502) with an endpoint device 518, such as by programming hardware configuration registers (e.g., during a boot sequence) to assign access to certain interconnect resources (e.g., physical layer lanes) to the particular root port, such that a software or firmware instance (SW/FW instance) executing on the processor corresponding to the root port has access to or control over the endpoint device 518 (e.g., access to hardware registers of the endpoint device). Each root space may have at least one corresponding I/O controller in the PCH 506 that facilitates communication between a SW/FW instance (e.g., an operating system) and the associated endpoint device. For example, a host CPU root space may have a host CPU root space PCIe controller that facilitates PCIe-based communication between a CPU 502 and an endpoint device 518, and an ME root space may have an ME root space PCIe controller that facilitates PCIe-based communications between the processor 508 in ME 507 and an endpoint device 518. In some embodiments, each root space of system 500 may be considered as independent from other root spaces of the system 500.

The PCH 506 includes a manageability engine (ME) 507, a power management controller (PMC) 510, multiple input/output (I/O) controllers 513, a flexible I/O adapter (FIA) 514, and physical layer circuitry 515. The PCH 506 is coupled to one or more endpoint devices 518 via link 516, which includes one or more lanes (e.g., High Speed I/O (HSIO) lanes) to provide communication between the PCH 506 and the endpoint devices 518. The ME 507 and PMC 510 each include a processor (e.g., 508, 511, respectively) and memory (e.g., 509, 512, respectively), and may each implement an operating system (OS). The processors 508, 511 may each be any type of processor or processing device, such as a microprocessor, an embedded processor, a digital signal processor (DSP), a network processor, a handheld processor, an application processor, a co-processor, a system on a chip (SOC), or other device to execute code. The memories 509, 512 may include any suitable type of computer-readable medium accessible by the processors 508, 511, respectively. For instance, the memories 509, 512 may store instructions that are executable by the processors 508, 511, respectively, to implement a SW/FW instance in the system 500.

The processor 508 of the ME 507 may implement an ME OS via firmware stored in the memory 509. For instance, in some embodiments, the ME 507 may be a management engine provided by Intel®, an innovation engine provided by Intel®, a Converged Security Engine (CSE) or a Converged Security Management/Manageability Engine (CSME) provided by Intel®; Trusted Execution Technology (TXT) provided by Intel®; and/or the like. Further, in some embodiments, the ME circuitry may operate in conjunction with Active Management Technology (AMT) provided by Intel® and/or Intel® vPro™ Technology (vPro). The Intel® AMT and/or Intel® vPro™ may allow for remote provisioning of an ME OS on the ME 507, and remote management of the ME 507 once the ME OS has been successfully provisioned. In some cases, the processor 508 may include root complex logic similar to root complex logic 504, allowing the ME 507 to implement root complex functionality and establish an ME root space in the system 500 (separate from the host CPU root space of the system 500). The ME root space may have at least one corresponding I/O controller in the PCH 506 that facilitates communication between the ME root port/processor and the associated endpoint device. For example, the ME root space may have an ME root space PCIe controller that facilitates PCIe-based communication between a SW/FW instance (e.g., ME OS) executing on the ME processor 508 and an endpoint device 518.

In addition, in some cases, the processor 511 of the PMC 510 may implement a power management OS via firmware stored in the memory 512 to provide power management functionality. For instance, the power management OS may implement boot/reset logic that administers power management functions of the PCH 506, including one or more of: interfacing with other logic and controllers to perform power state transitions; configure, manage, and respond to wake events; aggregate and report latency tolerance information for devices and peripherals connected to or integrated with the PCH.

Each I/O controller 513 includes hardware circuitry to facilitate communications between a corresponding root space SW/FW instance (e.g., an operating system executing on a CPU 502, an operating system executing on ME processor 508, or another type of SW/FW instance executing on another processor of the system 500) and one or more of the endpoint devices 518. The I/O controllers 513 may each facilitate communications according to a particular interconnect protocol, such as PCIe-based protocols, USB-based protocols, or another type of protocol. Each I/O controller may include hardware circuitry that communicates with device drivers (e.g., host PCIe driver or ME PCIe driver) to facilitate the communications between its corresponding SW/FW instance and the endpoint devices 518 according to the interconnect protocol. The I/O controllers 513 interface with the physical layer circuitry 515 through the flexible I/O adapter (FIA) 514.

Figure 6:
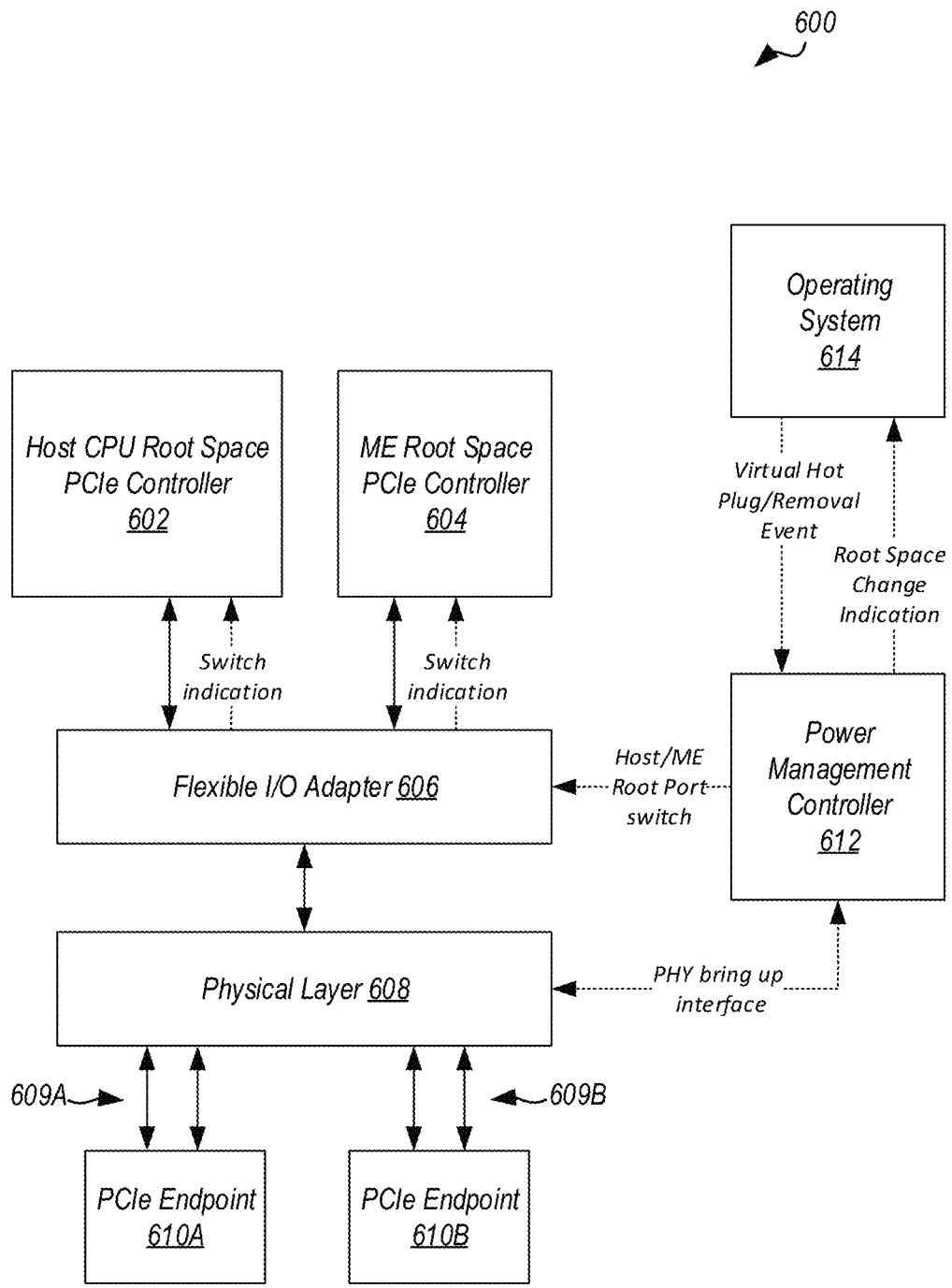
FIG. 6 illustrates an embodiment of example lane access switching between PCIe controllers in an interconnect architecture.

The FIA 514 may selectively configure access to the lanes of 516 by one or more of the I/O controllers 513 (e.g., a host CPU root space PCIe controller or an ME root space PCIe controller as shown in FIG. 6 and described further below) based on commands or other information from the PMC 510. For example, the FIA 514 may control which of I/O controllers 513 (and thus, which root space SW/FW instance) has access to each lane of the link 516, and may re-assign access to the lanes to another SW/FW instance I/O controller based on commands from the PMC 510 without requiring a reboot cycle (as normally required for changing communication links in a PCIe interconnect architecture, even if root ports are shared by a multiplexing-type device). A reboot cycle may refer to a cold boot cycle or warm reset cycle. Additionally, in some embodiments, the FIA 514 may selectively configure access to the lanes by one or more of a Gigabit Ethernet controller, an Extensible Host Controller Interface (xHCI) USB controller, and an Advanced Host Controller Interface (ACHI) SATA controller. The FIA 514 may selectively configure access to the lanes of link 516, in some embodiments, by mapping or assigning a particular root port to each lane. In some embodiments, links may be configured between each root space I/O controller as if they were static, and the FIA may select and assign lanes based on the configurations.

Modern computer systems may run multiple SW/FW instances, with each having their own PCIe root space (e.g., a host CPU root space and an ME root space as described herein). In typical PCIe systems, each configured root space has dedicated PCIe ports. That is, each PCIe port may be mapped to a particular root port of a root space, which may mean that each I/O controller is statically assigned particular lanes of a physical layer circuitry. This makes it impossible to share a device between multiple root spaces, as a reboot cycle is currently required to change PCIe port mappings. However, aspects of the present disclosure may allow for dynamic root space switching/lane re-assignment without requiring a reboot cycle, by leveraging a FIA that can selectively re-assign lanes. Using the proposed scheme described herein, it may be possible to dynamically change lanes using a PCIe controller supporting multi-functions and may also be is possible to extend detection through system fabric (e.g., PSF).

Dynamic control and selection of lane assignments by the FIA may provide numerous advantages. For instance, in some cases, it may enable fast and efficient transfer of large amounts of data between two or more root spaces (e.g., a software or firmware instance acting as a root port in the interconnect architecture). For example, a first root device instance can save a large amount of data to a storage device connected via a PCIe link, and the data can be immediately or nearly immediately made available to a second root device instance by re-assigning the PCIe lanes to the second device (e.g., switching the root space assignment). In some cases, this may be used to speed up the boot time of a multi-node system. As an example, an OS boot image in an HPC (high-performance computing) cluster can be pre-loaded to a PCIe storage device connected to a node manageability subsystem (e.g., a Manageability Engine such as ME 507 of FIG. 5) and switched to the host CPU during subsequent boot time. This may avoid network congestion when all the nodes in the cluster fetch their images from a centralized storage space, as pre-loading the image ahead of time over the network can happen while the host is working on computing its previous job data.

In addition, dynamic lane re-assignment may allow a root device instance to manage devices while the other root space is in low power state. As an example, while a host OS is in a low-power state (e.g., a "soft off" state, such as an ACPI S5 platform power state, where a system is in a full shutdown, a "hibernate" state, such as an ACPI S4 state, or another low-power state), a Manageability Engine (ME) FW instance can manage a PCIe NVMe drive that is normally used by the host OS when it is powered on (e.g., in a working state, such as an ACPI S0 platform power state, where the system is fully usable). This can be used for optimizing the device filesystem, health check, virus scan, etc. in some instances.

Further, dynamic lane re-assignment may allow for a lower total number of PCIe lanes supported by a device or system-on-chip (SoC), potentially lowering the cost of the device or SoC. Fewer total lanes are needed when lanes can be flexibly re-assigned between root spaces according to changing demand. If each of multiple root spaces has a need for PCIe ports, dynamic lane re-assignment may allow a system management agent to assign N number of PCIe ports to one root space and a remaining number PCIe to the other root space, removing the requirement of having a dedicated PCIe port for each root space (which can be wasteful depending on platform requirements). It may also allow for an agent to dynamically re-assign the number of PCIe ports to each root space based on changing requirement/needs of the platform without rebooting the system.

Still further, dynamic lane re-assignment may allow emergency access to information stored on a PCIe device when the root space that it is normally connected to becomes non-functional due to a software, firmware, or hardware failure. For example, a host can save important recovery or debug data to a PCIe storage device during operation, and the data (which might otherwise not be available before) could be recovered by an ME FW instance in the event of a host crash by re-assigning the PCIe lane to the ME FW instance in response to the crash. This may be extremely valuable in massively parallel processing systems when a failure and loss of data of one of the computing nodes impacts all the other nodes in the system (e.g., which may include upwards of tens of thousands of nodes). With embodiments of the present disclosure, the node-local checkpoint data can be reached in the event of a permanent node hardware failure.

The above examples can be combined in certain instances, as well. For example, the emergency access method described above with regard to a ME FW instance may be used to recover important data from a device, and a combination of the boot image example and the lower power state example can be used to reinstall a new OS image (if the previous one has been corrupted). In this way, the regular boot device may become a recovery device as well, realizing the savings described above with respect to no longer needing dedicated PCIe ports.

FIG. 6 illustrates an embodiment of example lane access switching between PCIe controllers in an interconnect architecture. In the example shown, a system 600 includes a Host CPU root space PCIe controller 602 and an ME root space PCIe controller 604 coupled to physical layer circuitry 608 via a flexible I/O adapter (FIA) 606. The system 600 further includes a power management controller (PMC) 612 communicably coupled to the FIA 606 and the physical layer circuitry 608. One or more aspects of system 600 may be implemented in a platform controller hub (PCH) apparatus, such as PCH 506 of FIG. 5. For instance, each of the PCIe controllers 602, 604 may be implemented similar to the I/O controllers 513 of FIG. 5, the FIA 606 may be implemented similar to the FIA 514 of FIG. 5, the physical layer circuitry 608 may be implemented similar to the physical layer circuitry 515 of FIG. 5, and the PMC 612 may be implemented similar to the PMC 510 of FIG. 5.

The PCIe controller 602 may couple a host processor (e.g., CPU 502 of FIG. 5) to the physical layer circuitry 608, and the PCIe controller 604 may couple an ME processor (e.g., processor 508 of FIG. 5) to the physical layer circuitry 608. The physical layer circuitry 608 includes a plurality of lanes 609 to couple the physical layer circuitry 608 to the PCIe endpoint devices 610. In the example shown, the physical layer circuitry 608 includes two lanes 609A coupling the physical layer circuitry 608 to the PCIe endpoint device 610A, and two lanes 609B coupling the physical layer circuitry 608 to the PCIe endpoint device 610B. The FIA 606 includes circuitry that allows for the selective assignment of the lanes 609 to either of the PCIe controllers 602 (and thus, to their respective root spaces) without requiring a reboot cycle. The FIA 606 may assign or re-assign one or more of the lanes 609 to the PCIe controllers 602, 604 based on data (e.g., commands) from the PMC 612.

In the example shown, assignment of the lanes 609 is switched dynamically from the host CPU root space to the ME root space. This may be performed in response to a power state change in the host CPU root space. For example, in response to a crash of the SW/FW instance executing on the host CPU or the host CPU entering a low-power state, the PMC may switch assignment of the PCIe endpoint devices 610 from the host CPU root space to the ME root space. The root space switching/lane re-assignment from the host PCIe controller 602 to ME root space PCIe controller 604 is performed through the FIA 606, which performs the re-assignment by re-mapping the lanes 609 from the host CPU root space PCIe controller 602 to the ME root space PCIe controller 604.

The operating system (OS) 614 executing on the PMC 612 generates a virtual hot removal event indication for the host CPU root space and provides the hot removal event indication to the PMC driver. In addition, the OS 614 may generate a hot add event indication for the ME root space and may provide the hot add event indication to the PMC driver. The PCIe controllers 602, 604 may generate respective interrupts to be serviced by the host and ME SW/FW instances (e.g., OS/BIOS). The interrupts may indicate that a hot add/remove event is happening in the respective root space. The software or firmware that supports hot plug events will quiesce (hot remove) or start up (hot add) traffic between the respective root spaces and the endpoint device (s). The PMC 612 then ensures that there is no outstanding traffic pending between the host CPU and the endpoint devices 610. For example, in some cases, the PMC may verify that it has received a ResetPrep message from the host CPU root space PCIe controller, or may receive an indication provided by the host CPU root space PCIe controller indicating that it is quiesced. If there is no pending traffic, the PMC 612 commands the FIA 606 to re-assign the lanes 609 to the ME root space PCIe controller 604. In certain embodiments, the PCIe controller ownership can be determined or changed based on: a boot time requirement for the system to access a specific root space device, a predefined policy that calls for a root space switch during S0 to Sx (e.g., S5) and Sx (e.g., S5) to S0 power state transitions, or runtime system requirements or OS driven requirements. In some cases, the FIA 606 may provide an indication to the host CPU root space PCIe controller 602, the ME root space PCIe controller 604, or both, of the lane re-assignment, so that the respective controllers may be aware of which controller has access to the lanes currently.

For instance, in some embodiments, the steps to switch lane assignments between root spaces may include the PMC 612 first generating a virtual hot plug event to the root space PCIe controller that currently controls the physical layer I/O lanes (e.g., the host CPU root space PCIe controller 602) to indicate a hot removal event. The OS/BIOS associated with the current root space may respond by quiescing, shutting down, or disabling the currently assigned physical layer I/O lanes. The PMC 612 may wait for the current PCIe controller to shutdown/disable the physical layer lanes, and then may cause the FIA 606 to configure access to the physical layer lanes to a new root space PCIe controller (e.g., the ME root space PCIe controller 604). The PMC 612 may then generate a virtual hot plug event to the new root space PCIe controller to indicate the hot add, and the OS/BIOS associated with the new root space may respond by training the physical layer I/O lanes and start up traffic to configure the endpoint device(s) (e.g., 610). Once this is done, the PCIe lanes and connected endpoint device(s) have been switched from the original root space to the new root space without requiring a reboot cycle.

Figure 7:
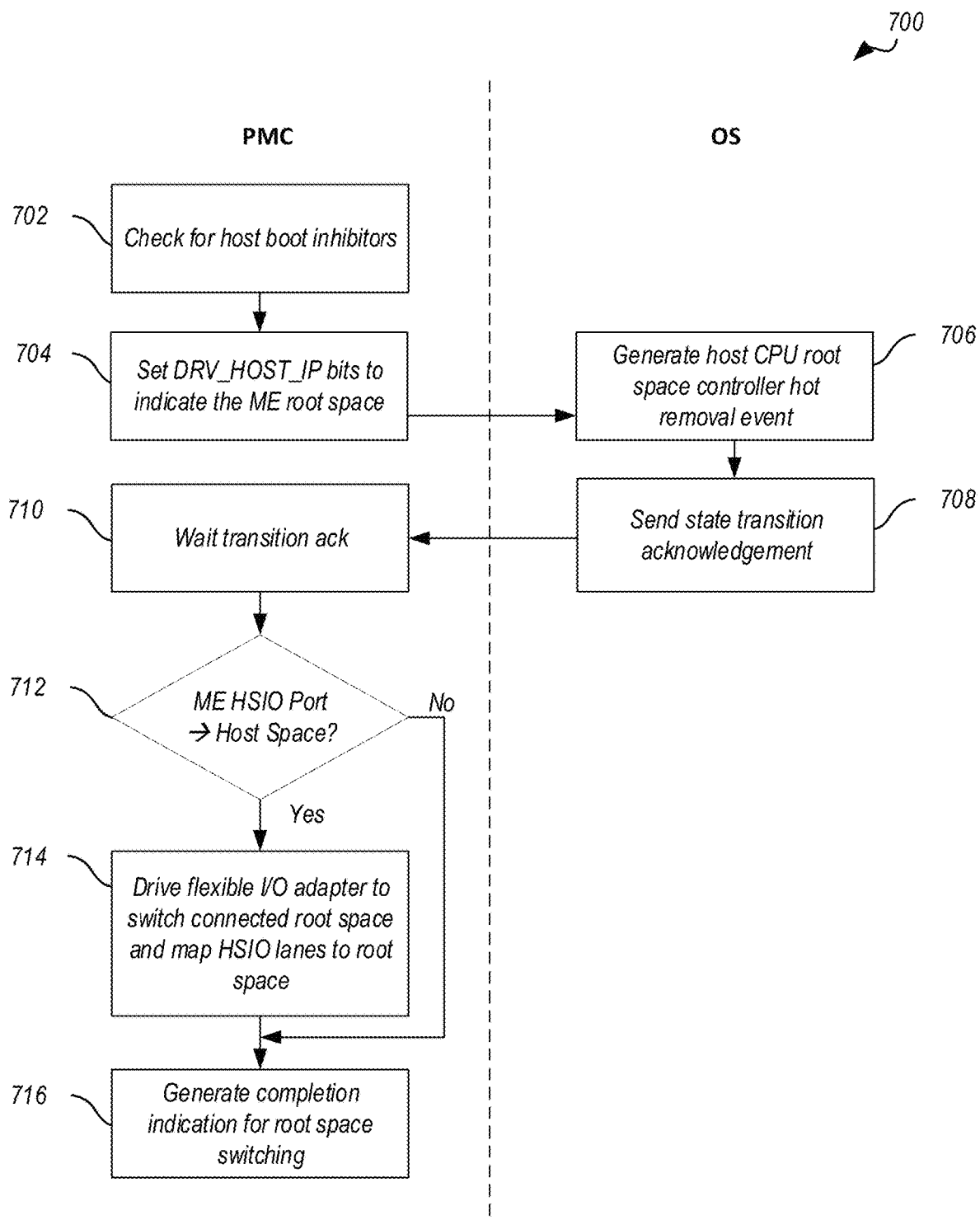
FIG. 7 illustrates an embodiment of signaling between a power management controller (PMC) and an operating system (OS) to dynamically assign access to physical layer lanes of an interconnect architecture.

FIG. 7 illustrates an embodiment of signaling between a power management controller (PMC) and an operating system (OS) to dynamically assign access to physical layer lanes of an interconnect architecture. The PMC of FIG. 7 may be, for example, the PMC 612 of FIG. 6, and the OS of FIG. 7 may be, for example, the OS 614 of FIG. 6. The operations of FIG. 7 reference a host CPU root space and ME root space, which may be similar to the host CPU root and ME root spaces described above.

In the example shown, a host CPU root space is switched to an ME root space. First, the PMC checks for boot inhibitors at 702 and then sets DRV_HOST_IP bits in the PMC to the ME root space. In response, the OS generates a host CPU root space hot removal event at 706 and sends a state transition acknowledgement to the PMC at 708. The PMC waits for the transition acknowledgement at 710, and when it is received, the PMC determines whether the ME HSIO port is to be set to the host space at 712. If so, the PMC drives a flexible I/O adapter to switch the connected root space and to map the HSIO lanes to the ME root space at 714. When complete, the PMC generates a root space switch completion indication to the OS at 716.

Figure 8:
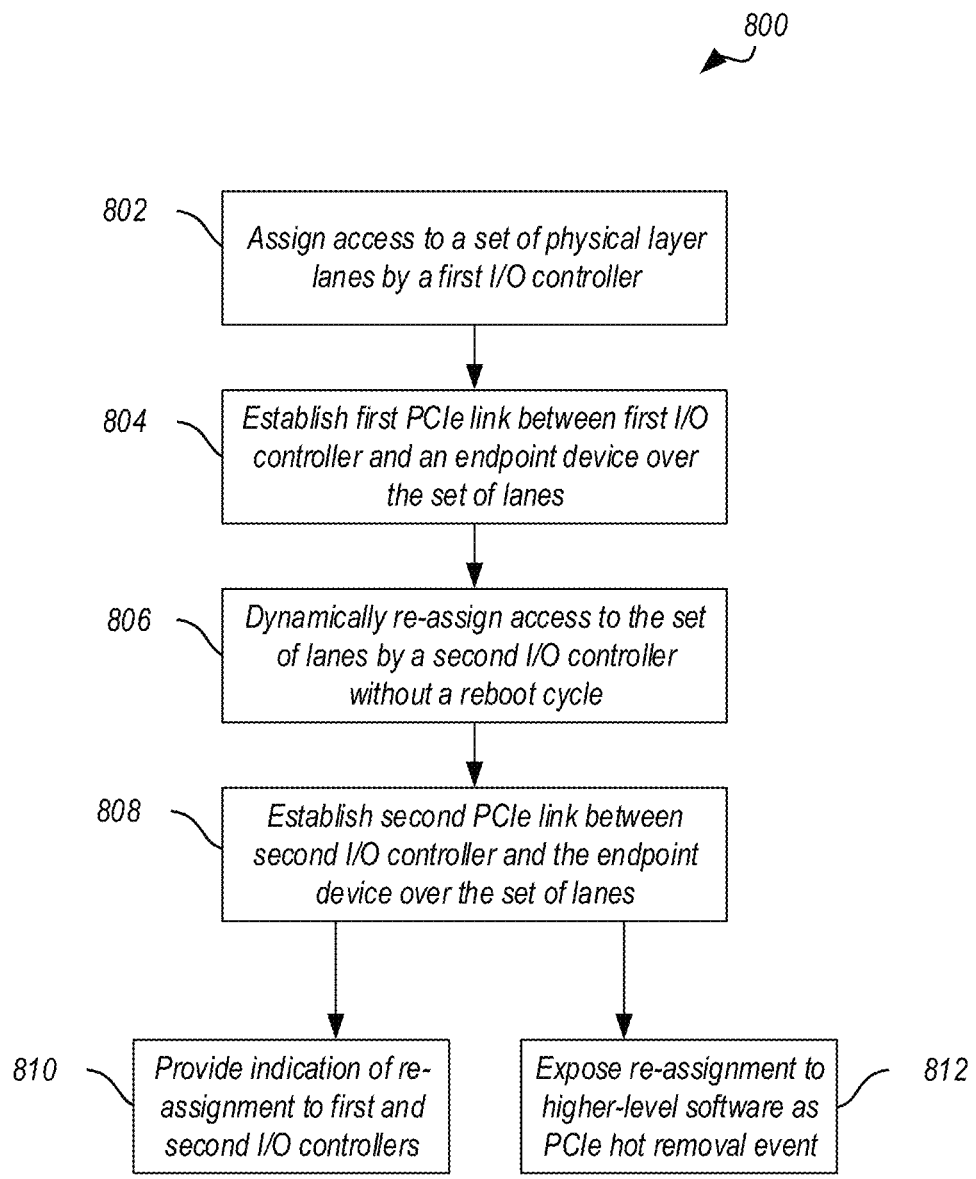
FIG. 8 illustrates an embodiment of a process of selectively controlling access to physical layer lanes of an interconnect architecture by multiple input/output (I/O) controllers.

FIG. 8 illustrates an embodiment of a process of selectively controlling access to physical layer lanes of an interconnect architecture by multiple input/output (I/O) controllers. Operations in the example process 800 may be performed by components of a system implementing a PCIe interconnect architecture, and in some instances, may be performed by a platform controller hub (PCH) or components thereof (e.g., a PMC). In some embodiments, a computer-readable medium may be encoded with instructions (e.g., a computer program) that implement one or more of the operations in the example process 800. The example process 800 may include additional or different operations, and the operations may be performed in the order shown or in another order. In some cases, one or more of the operations shown in FIG. 8 are implemented as processes that include multiple operations, sub-processes, or other types of routines. In some cases, operations can be combined, performed in another order, performed in parallel, iterated, or otherwise repeated or performed another manner.

At 802, access to a set of physical layer lanes is initially assigned to a first I/O controller in an interconnect architecture, where the physical layer lanes are coupled to an endpoint device (e.g., as shown in FIGS. 5-6). The first I/O controller may be associated with a first processor of a system incorporating the interconnect architecture. The assignment may be performed by a flexible I/O adapter (FIA) coupled to the lanes (e.g., the FIA 606 of FIG. 6) based on data or commands received from a power management controller (PMC) (e.g., the PMC 612 of FIG. 6). For example, at boot time, the PMC may command the FIA to assign access to the lanes by a host CPU PCIe controller of a system (e.g., the host CPU root space PCIe controller 602 of FIG. 6).

At 804, a first PCIe link is established between the first I/O controller and the endpoint device over the set of lanes. This may include associating the particular root port corresponding to the first processor with the endpoint device, such as by programming hardware configuration registers to assign access to the set of lanes by the first I/O controller. This may allow a SW/FW instance executing on the first processor associated with the first I/O controller to have access to or control over the endpoint device.

At 806, access to the set of lanes is dynamically re-assigned to a second I/O controller without performing a reboot cycle. The second I/O controller may be associated with a second processor of the system that includes the interconnect architecture. The re-assignment may be performed by the FIA based on data or commands issued by the PMC, similar to above. The PMC may initiate the switch based on detecting a power state transition in the processor associated with the first I/O controller. For example, the PMC may detect that a host CPU has gone into a low power state, and may accordingly initiate re-assignment of the lanes to an ME processor associated with the second I/O controller. In some embodiments, the PMC may first verify that there is no outstanding traffic pending on the first PCIe link before re-assigning access to the set of lanes.

At 808, a second PCIe link is established between the second I/O controller and the endpoint device over the set of lanes. The second PCIe link may be established in the same manner as the first PCIe link. At 810, an indication of the lane re-assignment is provided to the first and second I/O controllers. In this manner, the PCIe controllers may be aware of the lane assignment, and may accordingly avoid communication with the endpoint device if they are not currently assigned access to the device. Also, at 812, the lane re-assignment is exposed to higher-level software as a PCIe hot removal event.

Note that the apparatus', methods', and systems described above may be implemented in any electronic device or system as aforementioned. As specific illustrations, the figures described below provide exemplary systems for utilizing the present disclosure. As the systems below are described in more detail, a number of different interconnects are disclosed, described, and revisited from the discussion above. And as is readily apparent, the advances described above may be applied to any of those interconnects, fabrics, or architectures. For instance, a host and device may be implemented, which are equipped with functionality to implement authentication and measurement architectures as discussed in the examples above, in any one of a variety of computing architectures (e.g., using any one of a variety of different interconnects or fabrics). For instance, a host may connect to a device supporting the authentication architecture within a personal computing system (e.g., implemented in a laptop, desktop, mobile, smartphone, Internet of Things (IoT) device, smart appliance, gaming console, media console, etc.). In another example, a host may connect to a device supporting the authentication architecture within a server computing system (e.g., a rack server, blade server, tower server, rack scale server architecture or other disaggregated server architecture), among other examples.

Figure 9:
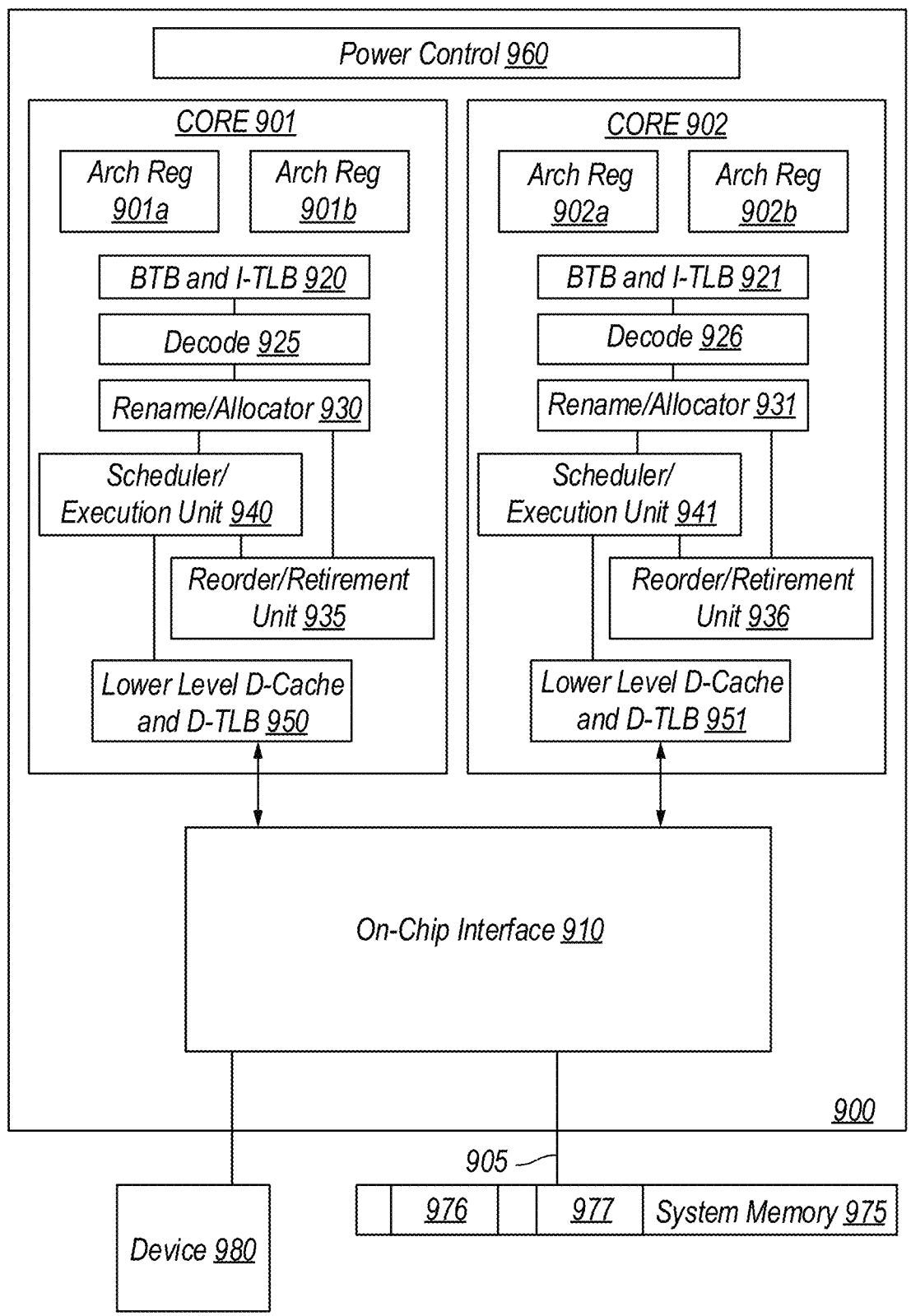
FIG. 9 illustrates an embodiment of a block diagram for a computing system including a multicore processor

Referring to FIG. 9, an embodiment of a block diagram for a computing system including a multicore processor is depicted. Processor 900 includes any processor or processing device, such as a microprocessor, an embedded processor, a digital signal processor (DSP), a network processor, a handheld processor, an application processor, a co-processor, a system on a chip (SOC), or other device to execute code. Processor 900, in one embodiment, includes at least two cores—core 901 and 902, which may include asymmetric cores or symmetric cores (the illustrated embodiment). However, processor 900 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 900, as illustrated in FIG. 9, includes two cores—core 901 and 902. Here, core 901 and 902 are considered symmetric cores, i.e. cores with the same configurations, functional units, and/or logic. In another embodiment, core 901 includes an out-of-order processor core, while core 902 includes an in-order processor core. However, cores 901 and 902 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (i.e. asymmetric cores), some form of translation, such a binary translation, may be utilized to schedule or execute code on one or both cores. Yet to further the discussion, the functional units illustrated in core 901 are described in further detail below, as the units in core 902 operate in a similar manner in the depicted embodiment.

As depicted, core 901 includes two hardware threads 901a and 901b, which may also be referred to as hardware thread slots 901a and 901b. Therefore, software entities, such as an operating system, in one embodiment potentially view processor 900 as four separate processors, i.e., four logical processors or processing elements capable of executing four software threads concurrently. As alluded to above, a first thread is associated with architecture state registers 901a, a second thread is associated with architecture state registers 901b, a third thread may be associated with architecture state registers 902a, and a fourth thread may be associated with architecture state registers 902b. Here, each of the architecture state registers (901a, 901b, 902a, and 902b) may be referred to as processing elements, thread slots, or thread units, as described above. As illustrated, architecture state registers 901a are replicated in architecture state registers 901b, so individual architecture states/contexts are capable of being stored for logical processor 901a and logical processor 901b. In core 901, other smaller resources, such as instruction pointers and renaming logic in allocator and renamer block 930 may also be replicated for threads 901a and 901b. Some resources, such as re-order buffers in reorder/retirement unit 935, ILTB 920, load/store buffers, and queues may be shared through partitioning. Other resources, such as general purpose internal registers, page-table base register(s), low-level data-cache and data-TLB 915, execution unit(s) 940, and portions of out-of-order unit 935 are potentially fully shared.

Processor 900 often includes other resources, which may be fully shared, shared through partitioning, or dedicated by/to processing elements. In FIG. 9, an embodiment of a purely exemplary processor with illustrative logical units/resources of a processor is illustrated. Note that a processor may include, or omit, any of these functional units, as well as include any other known functional units, logic, or firmware not depicted. As illustrated, core 901 includes a simplified, representative out-of-order (OOO) processor core. But an in-order processor may be utilized in different embodiments. The OOO core includes a branch target buffer 920 to predict branches to be executed/taken and an instruction-translation buffer (I-TLB) 920 to store address translation entries for instructions.

Core 901 further includes decode module 925 coupled to fetch unit 920 to decode fetched elements. Fetch logic, in one embodiment, includes individual sequencers associated with thread slots 901a, 901b, respectively. Usually core 901 is associated with a first ISA, which defines/specifies instructions executable on processor 900. Often machine code instructions that are part of the first ISA include a portion of the instruction (referred to as an opcode), which references/specifies an instruction or operation to be performed. Decode logic 925 includes circuitry that recognizes these instructions from their opcodes and passes the decoded instructions on in the pipeline for processing as defined by the first ISA. For example, as discussed in more detail below decoders 925, in one embodiment, include logic designed or adapted to recognize specific instructions, such as transactional instruction. As a result of the recognition by decoders 925, the architecture or core 901 takes specific, predefined actions to perform tasks associated with the appropriate instruction. It is important to note that any of the tasks, blocks, operations, and methods described herein may be performed in response to a single or multiple instructions; some of which may be new sor old instructions. Note decoders 926, in one embodiment, recognize the same ISA (or a subset thereof). Alternatively, in a heterogeneous core environment, decoders 926 recognize a second ISA (either a subset of the first ISA or a distinct ISA).

In one example, allocator and renamer block 930 includes an allocator to reserve resources, such as register files to store instruction processing results. However, threads 901a and 901b are potentially capable of out-of-order execution, where allocator and renamer block 930 also reserves other resources, such as reorder buffers to track instruction results. Unit 930 may also include a register renamer to rename program/instruction reference registers to other registers internal to processor 900. Reorder/retirement unit 935 includes components, such as the reorder buffers mentioned above, load buffers, and store buffers, to support out-of-order execution and later in-order retirement of instructions executed out-of-order.

Scheduler and execution unit(s) block 940, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 950 are coupled to execution unit(s) 940. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 901 and 902 share access to higher-level or further-out cache, such as a second level cache associated with on-chip interface 910. Note that higher-level or further-out refers to cache levels increasing or getting further way from the execution unit(s). In one embodiment, higher-level cache is a last-level data cache—last cache in the memory hierarchy on processor 900—such as a second or third level data cache. However, higher level cache is not so limited, as it may be associated with or include an instruction cache. A trace cache—a type of instruction cache—instead may be coupled after decoder 925 to store recently decoded traces. Here, an instruction potentially refers to a macro-instruction (i.e. a general instruction recognized by the decoders), which may decode into a number of micro-instructions (micro-operations).

In the depicted configuration, processor 900 also includes on-chip interface module 910. Historically, a memory controller, which is described in more detail below, has been included in a computing system external to processor 900. In this scenario, on-chip interface 910 is to communicate with devices external to processor 900, such as system memory 975, a chipset (often including a memory controller hub to connect to memory 975 and an I/O controller hub to connect peripheral devices), a memory controller hub, a northbridge, or other integrated circuit. And in this scenario, bus 905 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 975 may be dedicated to processor 900 or shared with other devices in a system. Common examples of types of memory 975 include DRAM, SRAM, non-volatile memory (NV memory), and other known storage devices. Note that device 980 may include a graphic accelerator, processor or card coupled to a memory controller hub, data storage coupled to an I/O controller hub, a wireless transceiver, a flash device, an audio controller, a network controller, or other known device.

Recently however, as more logic and devices are being integrated on a single die, such as SOC, each of these devices may be incorporated on processor 900. For example in one embodiment, a memory controller hub is on the same package and/or die with processor 900. Here, a portion of the core (an on-core portion) 910 includes one or more controller(s) for interfacing with other devices such as memory 975 or a graphics device 980. The configuration including an interconnect and controllers for interfacing with such devices is often referred to as an on-core (or un-core configuration). As an example, on-chip interface 910 includes a ring interconnect for on-chip communication and a high-speed serial point-to-point link 905 for off-chip communication. Yet, in the SOC environment, even more devices, such as the network interface, co-processors, memory 975, graphics processor 980, and any other known computer devices/interface may be integrated on a single die or integrated circuit to provide small form factor with high functionality and low power consumption.

In one embodiment, processor 900 is capable of executing a compiler, optimization, and/or translator code 977 to compile, translate, and/or optimize application code 976 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etc. in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Similar to a compiler, a translator, such as a binary translator, translates code either statically or dynamically to optimize and/or translate code. Therefore, reference to execution of code, application code, program code, or other software environment may refer to: (1) execution of a compiler program(s), optimization code optimizer, or translator either dynamically or statically, to compile program code, to maintain software structures, to perform other operations, to optimize code, or to translate code; (2) execution of main program code including operations/calls, such as application code that has been optimized/compiled; (3) execution of other program code, such as libraries, associated with the main program code to maintain software structures, to perform other software related operations, or to optimize code; or (4) a combination thereof.

Figure 10:
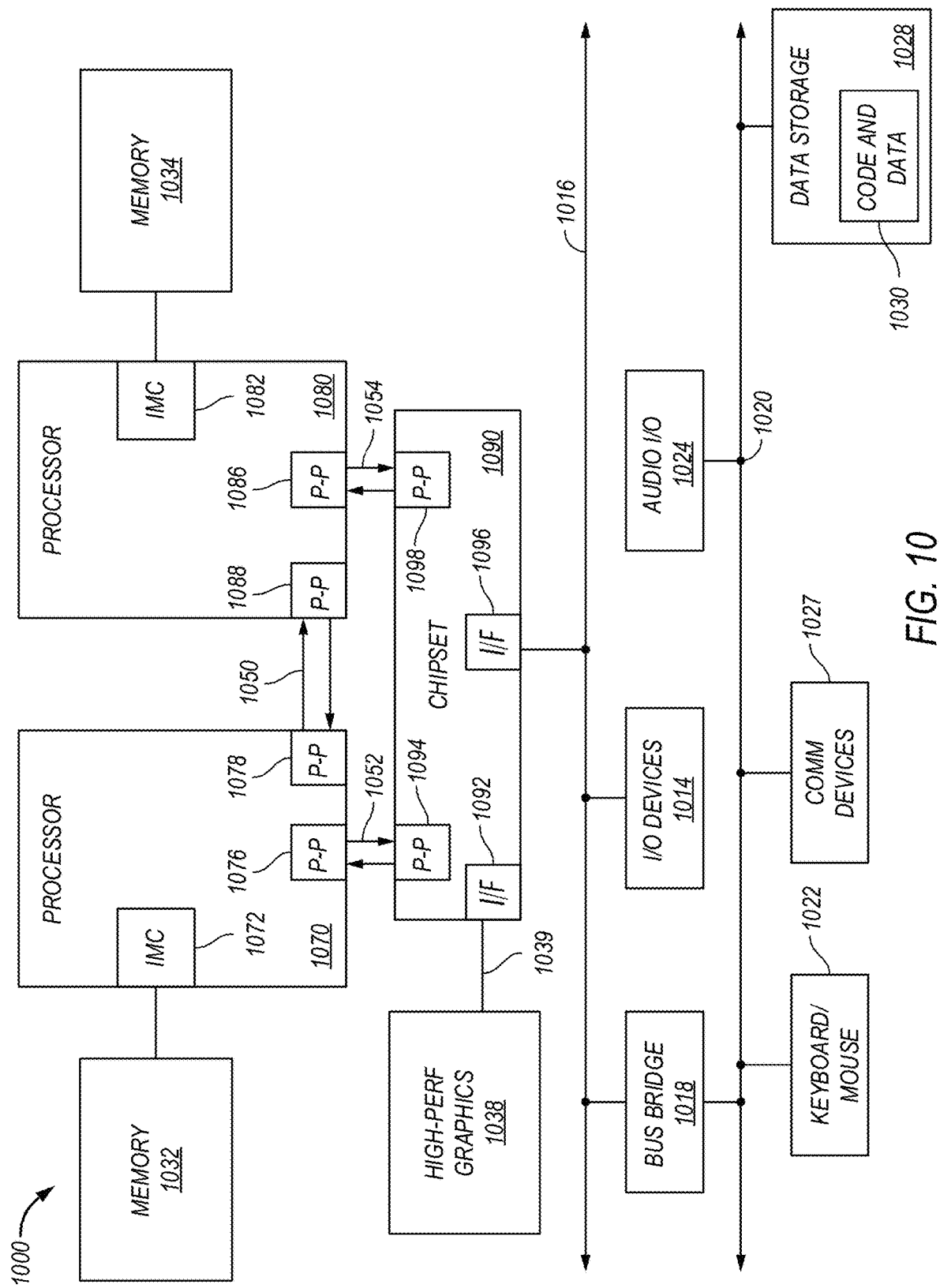
FIG. 10 illustrates an embodiment of a block for a computing system including multiple processors.

Referring now to FIG. 10, shown is a block diagram of another system 1000 in accordance with an embodiment of the present disclosure. As shown in FIG. 10, multiprocessor system 1000 is a point-to-point interconnect system, and includes a first processor 1070 and a second processor 1080 coupled via a point-to-point interconnect 1050. Each of processors 1070 and 1080 may be some version of a processor. In one embodiment, 1052 and 1054 are part of a serial, point-to-point coherent interconnect fabric, such as a high-performance architecture. As a result, certain embodiments may be implemented within the QPI architecture.

While shown with only two processors 1070, 1080, it is to be understood that the scope of the present disclosure is not so limited. In other embodiments, one or more additional processors may be present in a given processor.

Processors 1070 and 1080 are shown including integrated memory controller units 1072 and 1082, respectively. Processor 1070 also includes as part of its bus controller units point-to-point (P-P) interfaces 1076 and 1078; similarly, second processor 1080 includes P-P interfaces 1086 and 1088. Processors 1070, 1080 may exchange information via a point-to-point (P-P) interface 1050 using P-P interface circuits 1078, 1088. As shown in FIG. 10, IMCs 1072 and 1082 couple the processors to respective memories, namely a memory 1032 and a memory 1034, which may be portions of main memory locally attached to the respective processors.

Processors 1070, 1080 each exchange information with a chipset 1090 via individual P-P interfaces 1052, 1054 using point to point interface circuits 1076, 1094, 1086, 1098. Chipset 1090 also exchanges information with a high-performance graphics circuit 1038 via an interface circuit 1092 along a high-performance graphics interconnect 1039.

A shared cache (not shown) may be included in either processor or outside of both processors; yet connected with the processors via P-P interconnect, such that either or both processors' local cache information may be stored in the shared cache if a processor is placed into a low power mode.

Chipset 1090 may be coupled to a first bus 1016 via an interface 1096. In one embodiment, first bus 1016 may be a Peripheral Component Interconnect (PCI) bus, or a bus such as a PCI Express bus or another third generation I/O interconnect bus, although the scope of the present disclosure is not so limited.

As shown in FIG. 10, various I/O devices 1014 are coupled to first bus 1016, along with a bus bridge 1018 which couples first bus 1016 to a second bus 1020. In one embodiment, second bus 1020 includes a low pin count (LPC) bus. Various devices are coupled to second bus 1020 including, for example, a keyboard and/or mouse 1022, communication devices 1027 and a storage unit 1028 such as a disk drive or other mass storage device which often includes instructions/code and data 1030, in one embodiment. Further, an audio I/O 1024 is shown coupled to second bus 1020. Note that other architectures are possible, where the included components and interconnect architectures vary. For example, instead of the point-to-point architecture of FIG. 10, a system may implement a multi-drop bus or other such architecture.

The foregoing disclosure has presented example systems and methods to provide dynamic lane-reassignment and root space switching between PCIe root spaces. It should be appreciated that other systems and methods for dynamic lane re-assignment may be contemplated without departing from the more generalized principles contained within this disclosure. For instance, while some of the example systems and methods discussed herein were described with reference to PCIe or PCIe-based protocols, it should be appreciated that similar, corresponding enhancements may be made to other interconnect protocols, such OpenCAPI™, Gen-Z™, UPI, Universal Serial Bus, (USB), Cache Coherent Interconnect for Accelerators (CCIX™), Advanced Micro Device™'s (AMD™) Infinity™, Common Communication Interface (CCI), or Qualcomm™'s Centrig™ interconnect, among others.

While the present disclosure has been described with respect to a limited number of embodiments, those skilled in the art will appreciate numerous modifications and variations therefrom. It is intended that the appended claims cover all such modifications and variations as fall within the true spirit and scope of this present disclosure.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform certain embodiments may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

The following examples pertain to embodiments in accordance with this Specification. It will be understood that certain examples listed below may be combined with other examples, or certain aspects of other examples.

Example 1 includes an apparatus, comprising: physical layer circuitry comprising one or more lanes to couple the apparatus to one or more endpoint devices; a first input/output (I/O) controller comprising circuitry to couple a first processor to the physical layer circuitry, the first I/O controller compatible with a Peripheral Component Interconnect Express (PCIe)-based protocol; a second I/O controller comprising circuitry to couple a second processor to the physical layer circuitry, the second I/O controller compatible with the PCIe-based protocol; a flexible input/output adapter (FIA) coupling the first and second I/O controllers to the one or more lanes, wherein the FIA comprises circuitry to selectively assign access to each lane of the one or more lanes by either the first I/O controller or the second I/O controller; and a power management controller (PMC) communicably coupled to the FIA, the PMC comprising circuitry to cause the FIA to dynamically assign access to at least one of the lanes by the first or second I/O controller without a reboot cycle.

Example 2 includes the subject matter of Example 1, and optionally, wherein the FIA circuitry is to selectively assign access to the lanes of the physical layer circuitry by changing a root port assignment for the lanes.

Example 3 includes the subject matter of any of the preceding Examples, and optionally, wherein the FIA circuitry is further to provide an indication of the lane-reassignment to each of the first and second I/O controller.

Example 4 includes the subject matter of any of the preceding Examples, and optionally, wherein the PMC circuitry is further to generate a hot removal event to higher-level software based on lane re-assignment by the FIA.

Example 5 includes the subject matter of any of the preceding Examples, and optionally, wherein the PMC circuitry is to cause the FIA circuitry to dynamically re-assign access to one or more lanes based on detecting a power state transition in the first or second processor.

Example 6 includes the subject matter of any of the preceding Examples, and optionally, wherein the physical layer circuitry comprises a plurality of lanes to couple the apparatus to an endpoint device, and the FIA circuitry is to selectively assign access to each lane of the plurality of lanes by either the first or second I/O controller.

Example 7 includes the subject matter of any of the preceding Examples, and optionally, wherein the physical layer circuitry comprises a first set of lanes to couple the apparatus to a first endpoint device and a second set of lanes to couple the apparatus to a second endpoint device, and the FIA circuitry is to selectively assign access to each lane of the first and second sets of lanes by either the first or second I/O controller.

Example 8 includes the subject matter of Examples 1-7, and optionally, wherein the first I/O controller circuitry is to couple a host processor of a device incorporating the apparatus to the physical layer circuitry, and the second I/O controller circuitry is to couple a processor incorporated within the apparatus to the physical layer circuitry.

Example 9 includes the subject matter of Examples 1-7, and optionally, wherein the first I/O controller circuitry is to couple a first host processor of a device incorporating the apparatus to the physical layer circuitry, and the second I/O controller circuitry is to couple a second host processor of the device to the physical layer circuitry.

Example 10 includes non-transitory computer-readable media comprising instructions that, when executed, cause logic embodied on a host device to: assign, via a flexible input/output adapter (FIA), access to a set of lanes of physical layer circuitry by a first I/O controller; establish a first Peripheral Component Interconnect Express (PCIe)-based link between the first I/O controller and an endpoint device over the set of lanes of physical layer circuitry; dynamically re-assign, via the FIA, access to the set of lanes by a second I/O controller without a reboot cycle; and establish a second PCIe-based link between the second I/O controller and the endpoint device over the set of lanes of the physical layer circuitry.

Example 11 includes the subject matter of Example 10, and optionally, wherein the instructions are to re-assign access to the lanes by changing a root port assignment for the lanes.

Example 12 includes the subject matter of Examples 10-11, and optionally, wherein the instructions are to provide an indication of the lane re-assignment to each of the first and second I/O controller.

Example 13 includes the subject matter of Examples 10-12, and optionally, wherein the instructions are to expose the lane re-assignment to higher-level software as a hot removal event.

Example 14 includes the subject matter of Examples 10-13, and optionally, wherein the instructions are to dynamically re-assign access to the set of lanes based on detecting a power state transition in a processor associated with the first I/O controller.

Example 15 includes the subject matter of Examples 10-14, and optionally, wherein the instructions are to verify that there is no outstanding traffic pending on the first link before re-assigning access to the lanes.

Example 16 includes a system comprising an endpoint device; a host processor; and a controller hub communicably coupled to the processor and the endpoint device. The controller hub comprises: a manageability engine (ME) processor; physical layer circuitry comprising a set of lanes coupling the controller hub to the endpoint device; a first input/output (I/O) controller comprising circuitry coupling the host processor to the physical layer circuitry, the first I/O controller compatible with a Peripheral Component Interconnect Express (PCIe)-based protocol; a second I/O controller comprising circuitry coupling the ME processor to the physical layer circuitry, the second I/O controller compatible with a Peripheral Component Interconnect Express (PCIe)-based protocol; a flexible input/output adapter (FIA) coupling the first and second I/O controllers to the set of lanes, wherein the FIA comprises circuitry to selectively assign access to each lane of the set of lanes by either the first I/O controller or the second I/O controller; and a power management controller (PMC) communicably coupled to the FIA, the PMC comprising circuitry to cause the FIA to dynamically assign access to the set of lanes between the first and second I/O controllers without a reboot cycle.

Example 17 includes the subject matter of Example 16, and optionally, wherein the FIA circuitry is to assign access to the set of lanes by changing a root memory space access for the set of lanes.

Example 18 includes the subject matter of Examples 16-17, and optionally, wherein the FIA is to provide an indication of the lane re-assignment to each of the first and second I/O controller.

Example 19 includes the subject matter of Examples 16-18, and optionally, wherein the PMC is to cause the FIA to dynamically re-assign access to the set of lanes by the ME processor in response to detecting a power state transition in the host processor.

Example 20 includes the subject matter of Examples 16-19, and optionally, wherein the set of lanes is a first set of lanes, the endpoint device is a first endpoint device, the system further comprises a second endpoint device, the physical layer circuitry further comprises a second set of lanes coupling the controller hub to the second endpoint device, the FIA is coupling the first and second I/O controllers to the second set of lanes, and the FIA circuitry is to selectively assign access to each lane of the second set of lanes by either the first I/O controller or the second I/O controller.

Example 21 includes a method comprising assigning, via a flexible input/output adapter (FIA), access to a set of lanes of physical layer circuitry by a first I/O controller; establishing a first Peripheral Component Interconnect Express (PCIe)-based link between the first I/O controller and an endpoint device over the set of lanes of physical layer circuitry; dynamically re-assigning, via the FIA, access to the set of lanes by a second I/O controller without a reboot cycle; and establishing a second PCIe-based link between the second I/O controller and the endpoint device over the set of lanes of the physical layer circuitry.

Example 22 includes the subject matter of Example 21, and optionally, wherein re-assigning access to the lanes comprises changing a root port assignment for the lanes.

Example 23 includes the subject matter of Examples 21-22, and optionally, further comprising providing an indication of the lane re-assignment to each of the first and second I/O controller.

Example 24 includes the subject matter of Examples 21-23, and optionally, further comprising exposing the lane re-assignment to higher-level software as a hot removal event.

Example 25 includes the subject matter of Examples 21-24, and optionally, wherein dynamically re-assigning access to the set of lanes is based on detecting a power state transition in the first processor.

Example 26 includes the subject matter of Examples 21-25, and optionally, further comprising verifying that there is no outstanding traffic pending on the first link before re-assigning access to the lanes.

Example 27 includes a system comprising means for assigning access to a set of lanes of physical layer circuitry by a first I/O controller; means for establishing a first Peripheral Component Interconnect Express (PCIe)-based link between the first I/O controller and an endpoint device over the set of lanes of physical layer circuitry; means for dynamically re-assigning access to the set of lanes by a second I/O controller without a reboot cycle; and means for establishing a second PCIe-based link between the second I/O controller and the endpoint device over the set of lanes of the physical layer circuitry.

Example 28 includes a system comprising an apparatus according to any one of Examples 1-9.

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. An apparatus comprising:
   physical layer circuitry comprising one or more lanes to couple the apparatus to one or more endpoint devices;
   a first input/output (I/O) controller comprising circuitry to couple a first processor to the physical layer circuitry, the first I/O controller compatible with a Peripheral Component Interconnect Express (PCIe)-based protocol;
   a second I/O controller comprising circuitry to couple a second processor to the physical layer circuitry, the second I/O controller compatible with the PCIe-based protocol;
   a flexible input/output adapter (FIA) coupling the first and second I/O controllers to the one or more lanes, wherein the FIA comprises circuitry to selectively assign access to each lane of the one or more lanes by either the first I/O controller or the second I/O controller; and
   a power management controller (PMC) communicably coupled to the FIA, the PMC comprising circuitry to cause the FIA to dynamically assign access to at least one of the lanes by the first or second I/O controller without a reboot cycle.

2. The apparatus of claim 1, wherein the FIA circuitry is to selectively assign access to the lanes of the physical layer circuitry by changing a root port assignment for the lanes.

3. The apparatus of claim 1, wherein the FIA circuitry is further to provide an indication of the lane-reassignment to each of the first and second I/O controller.

4. The apparatus of claim 1, wherein the PMC circuitry is further to generate a hot removal event to higher-level software based on lane re-assignment by the FIA.

5. The apparatus of claim 1, wherein the PMC circuitry is to cause the FIA circuitry to dynamically re-assign access to one or more lanes based on detecting a power state transition in the first or second processor.

6. The apparatus of claim 1, wherein the physical layer circuitry comprises a plurality of lanes to couple the apparatus to an endpoint device, and the FIA circuitry is to selectively assign access to each lane of the plurality of lanes by either the first or second I/O controller.

7. The apparatus of claim 1, wherein the physical layer circuitry comprises a first set of lanes to couple the apparatus to a first endpoint device and a second set of lanes to couple the apparatus to a second endpoint device, and the FIA circuitry is to selectively assign access to each lane of the first and second sets of lanes by either the first or second I/O controller.

8. The apparatus of claim 1, wherein the first I/O controller circuitry is to couple a host processor of a device incorporating the apparatus to the physical layer circuitry, and the second I/O controller circuitry is to couple a processor incorporated within the apparatus to the physical layer circuitry.

9. The apparatus of claim 1, wherein the first I/O controller circuitry is to couple a first host processor of a device incorporating the apparatus to the physical layer circuitry, and the second I/O controller circuitry is to couple a second host processor of the device to the physical layer circuitry.

10. A non-transitory computer-readable media comprising instructions that, when executed, cause logic embodied on a host device to:
    assign, via a flexible input/output adapter (FIA), access to a set of lanes of physical layer circuitry by a first I/O controller;
    establish a first Peripheral Component Interconnect Express (PCIe)-based link between the first I/O controller and an endpoint device over the set of lanes of physical layer circuitry;
    dynamically re-assign, via the FIA, access to the set of lanes by a second I/O controller without a reboot cycle; and
    establish a second PCIe-based link between the second I/O controller and the endpoint device over the set of lanes of the physical layer circuitry.

11. The computer-readable media of claim 10, wherein the instructions are to re-assign access to the lanes by changing a root port assignment for the lanes.

12. The computer-readable media of claim 10, wherein the instructions are to provide an indication of the lane re-assignment to each of the first and second I/O controller.

13. The computer-readable media of claim 10, wherein the instructions are to expose the lane re-assignment to higher-level software as a hot removal event.

14. The computer-readable media of claim 10, wherein the instructions are to dynamically re-assign access to the set of lanes based on detecting a power state transition in a processor associated with the first I/O controller.

15. The computer-readable media of claim 10, wherein the instructions are to verify that there is no outstanding traffic pending on the first link before re-assigning access to the lanes.

16. A system, comprising:
    an endpoint device;
    a host processor;
    a controller hub communicably coupled to the processor and the endpoint device, the controller hub comprising:
        a manageability engine (ME) processor;
        physical layer circuitry comprising a set of lanes coupling the controller hub to the endpoint device;
        a first input/output (I/O) controller comprising circuitry coupling the host processor to the physical layer circuitry, the first I/O controller compatible with a Peripheral Component Interconnect Express (PCIe)-based protocol;
        a second I/O controller comprising circuitry coupling the ME processor to the physical layer circuitry, the second I/O controller compatible with a Peripheral Component Interconnect Express (PCIe)-based protocol;
        a flexible input/output adapter (FIA) coupling the first and second I/O controllers to the set of lanes, wherein the FIA comprises circuitry to selectively assign access to each lane of the set of lanes by either the first I/O controller or the second I/O controller; and
        a power management controller (PMC) communicably coupled to the FIA, the PMC comprising circuitry to cause the FIA to dynamically assign access to the set of lanes between the first and second I/O controllers without a reboot cycle.

17. The system of claim 16, wherein the FIA circuitry is to assign access to the set of lanes by changing a root memory space access for the set of lanes.

18. The system of claim 16, wherein the FIA is to provide an indication of the lane re-assignment to each of the first and second I/O controller.

19. The system of claim 16, wherein the PMC is to cause the FIA to dynamically re-assign access to the set of lanes by the ME processor in response to detecting a power state transition in the host processor.

20. The system of claim 16, wherein the set of lanes is a first set of lanes, the endpoint device is a first endpoint device, the system further comprises a second endpoint device, the physical layer circuitry further comprises a second set of lanes coupling the controller hub to the second endpoint device, the FIA is coupling the first and second I/O controllers to the second set of lanes, and the FIA circuitry is to selectively assign access to each lane of the second set of lanes by either the first I/O controller or the second I/O controller.

* * * * *